(12) United States Patent
Takeda

(10) Patent No.: US 8,553,121 B2
(45) Date of Patent: Oct. 8, 2013

(54) IMAGING APPARATUS AND CONTROL METHOD THEREOF

(75) Inventor: Nobuhiro Takeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 773 days.

(21) Appl. No.: 12/099,870

(22) Filed: Apr. 9, 2008

(65) Prior Publication Data

US 2009/0009619 A1 Jan. 8, 2009

(30) Foreign Application Priority Data

Apr. 26, 2007 (JP) ................................. 2007-117562

(51) Int. Cl.
*H04N 5/335* (2011.01)
(52) U.S. Cl.
USPC .......................................... 348/302; 348/296
(58) Field of Classification Search
USPC ...... 348/222.1, 241, 294, 281, 296, 302–308; 358/482
See application file for complete search history.

(56) References Cited

U.S. PATENT DOCUMENTS

| | | | | |
|---|---|---|---|---|
| 5,272,536 | A * | 12/1993 | Sudo et al. | 348/243 |
| 5,731,578 | A * | 3/1998 | Mizuno | 250/208.1 |
| 6,166,769 | A * | 12/2000 | Yonemoto et al. | 348/308 |
| 7,154,548 | B2 * | 12/2006 | Liu | 348/302 |
| 7,567,281 | B2 * | 7/2009 | Yamaguchi et al. | 348/308 |
| 2002/0176009 | A1 * | 11/2002 | Johnson et al. | 348/229 |
| 2006/0181635 | A1 * | 8/2006 | He et al. | 348/367 |
| 2006/0291846 | A1 * | 12/2006 | Hosoya et al. | 396/123 |

FOREIGN PATENT DOCUMENTS

| | | |
|---|---|---|
| JP | 2001-045375 | 2/2001 |
| JP | 2005-057552 A | 3/2005 |
| JP | 2006-093816 A | 4/2006 |
| JP | 4695967 B2 | 6/2011 |

OTHER PUBLICATIONS

CMOS Active Pixel Image Sensor, Sunetra Mendis, Sabrina E. Kemeny and Eric R. Fossum "IEEE Transactions on Electron Devices", vol. 41, 1994, pp. 452-453.
Feb. 13, 2012 Japanese Office Action, which is enclosed without English Translation, that issued in Japanese Patent Application No. 2007-117562.

* cited by examiner

*Primary Examiner* — Tuan Ho
*Assistant Examiner* — Akshay Trehan
(74) *Attorney, Agent, or Firm* — Cowan, Liebowitz & Latman, P.C.

(57) ABSTRACT

An image sensor includes a plurality of photoelectric conversion units disposed in line and column directions, transfer capacitances that store a signal read out from the (n−1)th line (n being an integer of 2 or more) of the plurality of photoelectric conversion units, transfer capacitances that store a signal read out from the nth line of the plurality of photoelectric conversion units, and a system control CPU that controls the image sensor. While a level of a predetermined driving pulse generated within the image sensor changes during the period where the signal of the (n−1)th line stored in the transfer capacitance is read out from the transfer capacitances, the system control CPU control not to output the signal of the (n−1)th line from the transfer capacitances.

5 Claims, 6 Drawing Sheets

IMAGING APPARATUS AND CONTROL METHOD THEREOF

BACKGROUND OF THE INVENTION

1. Field of the Invention

The present invention relates to an imaging apparatus, such as a digital camera, and a control method thereof.

2. Description of the Related Art

CMOS image sensors are conventionally used as X-Y addressing type image sensors (see, for example, "IEEE Transactions on Electron Devices", Vol. 41, 1994, pp. 452-453). CMOS image sensors are advantageous in that they feature high signal-to-noise ratios and low power consumption, and furthermore, their peripheral circuits can be integrated into the chip. When using this type of CMOS image sensor, an operation for reading out a signal output from one line of pixels into transfer capacitances overlaps with the horizontal scan period, which outputs a signal from the transfer capacitances to the exterior of the image sensor. An image sensor and a readout method therefrom that reduces the time required for readout from the image sensor through such operations have been disclosed (see Japanese Patent Laid-Open No. 2001-45375).

However, according to the readout method disclosed in Japanese Patent Laid-Open No. 2001-45375, there is a problem in that noise arises in the signal stored in the transfer capacitance or the output signal in the horizontal output line due to the influence of a driving pulse applied to the image sensor.

SUMMARY OF THE INVENTION

Having been conceived in light of the aforementioned problem, it is an object of the present invention to prevent noise due to a driving pulse applied to an image sensor from arising while also shortening the amount of time required for readout from the image sensor.

A first aspect of the present invention is directed to an imaging apparatus comprising: an image sensor that includes a plurality of photoelectric conversion units disposed in line and column directions, a first storage unit configured to store a signal read out from the (n−1) th line (n being an integer of 2 or more) of the plurality of photoelectric conversion units, and a second storage unit configured to store a signal read out from the nth line of the plurality of photoelectric conversion units; and a control unit configured to control the image sensor, wherein, while a level of a predetermined driving pulse generated within the image sensor changes during the period where the signal of the (n−1)th line stored in the first storage unit is read out from the first storage unit, the control unit controls not to output the signal of the (n−1)th line stored in the first storage unit from the first storage unit.

A second aspect of the present invention is directed to a control method for an image sensor that includes a plurality of photoelectric conversion units disposed in line and column directions, a first storage unit configured to store a signal read out from the (n−1)th line (n being an integer of 2 or more) of the plurality of photoelectric conversion units, and a second storage unit configured to store a signal read out from the nth line of the plurality of photoelectric conversion units, comprising a control step of controlling, while a level of a predetermined driving pulse generated within the image sensor changes during the period where the signal of the (n−1)th line stored in the first storage unit is read out from the first storage unit, not to output the signal of the (n−1)th line stored in the first storage unit from the first storage unit.

According to the present invention, it is possible to prevent noise due to a driving pulse being applied to an image sensor from arising while also shortening the amount of time required for readout from the image sensor.

Further features of the present invention will become apparent from the following description of exemplary embodiments (with reference to the attached drawings).

DESCRIPTION OF THE EMBODIMENTS

Hereinafter, an imaging apparatus and control method thereof according to a preferred embodiment of the present embodiment shall be described in detail with reference to the drawings.

Figure 1:
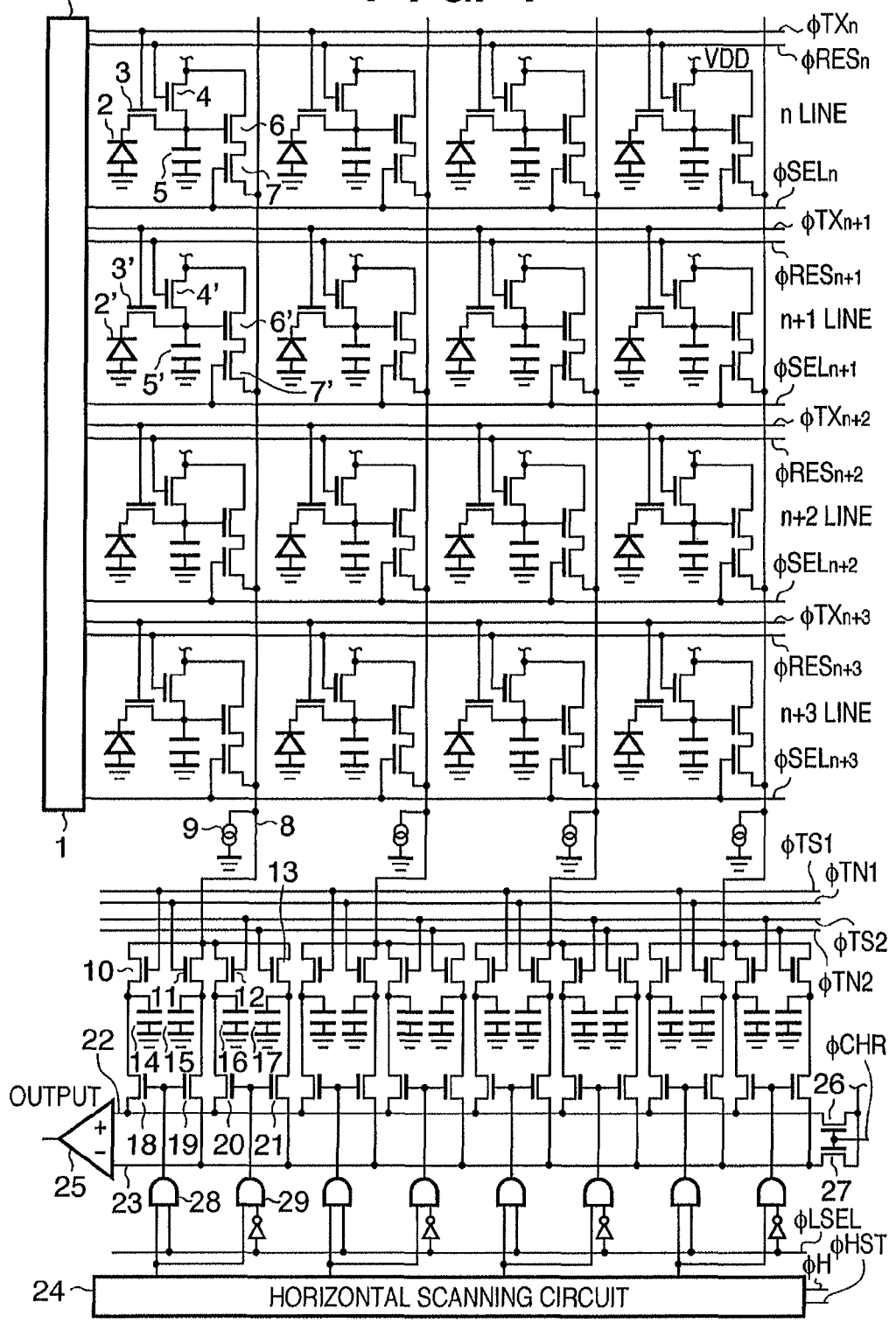
FIG. 1 is a diagram illustrating the configuration of an image sensor according to a preferred embodiment of the present invention.

FIG. 1 is a diagram illustrating the configuration of an image sensor according to a preferred embodiment of the present invention.

In FIG. 1, reference numeral 1 represents a vertical scanning circuit, reference numeral 2 represents a photoelectric converter, such as a photodiode or the like, for performing photoelectric conversion of a subject image, and reference numeral 3 represents a transfer switch for transferring an electric charge produced by the photoelectric converter 2 to a storage capacitance 5, included in a floating diffusion amplifier that shall be described later. Reference numeral 4 represents a reset switch that clears unnecessary charge accumulated in the photoelectric converter 2, the storage capacitance 5, and so on. Reference numeral 6 represents a source follower amplifier that amplifies the signal charge accumulated in the storage capacitance 5 and converts it into a voltage, whereas reference numeral 7 represents a line selection switch that connects the output terminal of the source follower amplifier 6 to a vertical output line 8. The aforementioned floating diffusion amplifier is configured of the reset switch 4, the storage capacitance 5, and the source follower amplifier 6. Reference numeral 9 represents a load current source for driving the source follower amplifier 6 of the line selected by the line selection switch 7. Reference numerals 10, 11, 12, and 13 represent transfer gates for transferring the signal outputted to the vertical output line 8 to transfer capacitances 14, 15, 16, and 17, serving as first and second storage units 18 and 20 represent readout switches used for outputting signals stored in the transfer capacitances 14 and 16 to a horizontal readout line 22. Meanwhile, reference numerals 19 and 21 represent readout switches used for outputting signals stored in the transfer capacitances 15 and 17 to a horizontal readout line 23. Reference numeral 24 represents a horizontal scanning circuit, serving as a driving unit for sequentially outputting signals from the transfer capacitances 14, 15, 16, and 17 to the horizontal readout lines 22 and 23. Reference numeral 25 represents an output amplifier that outputs the difference between the signal outputted to the horizontal readout line 22 and the signal outputted to the horizontal readout line 23 out of the image sensor. Reference numerals 26 and 27 represent reset switches for resetting the horizontal readout lines 22 and 23 to a predetermined voltage. Reference numerals 28 and 29 represent AND gates connected to the horizontal scanning circuit 24. The imaging apparatus is provided with a system control CPU 111 which shall be described later with reference to FIG. 3; the imaging apparatus controls the image sensor using the system control CPU 111. Note that in FIG. 1, an apostrophe (') has been added to the reference numerals of constituent elements of another pixel in order to simplify descriptions. In other words, reference numeral 2' represents a photoelectric converter; reference numeral 3', a transfer switch; reference numeral 4', a reset switch; reference numeral 5', a storage capacitance; reference numeral 6', a source follower amplifier; and 7', a line selection switch.

Figure 6:
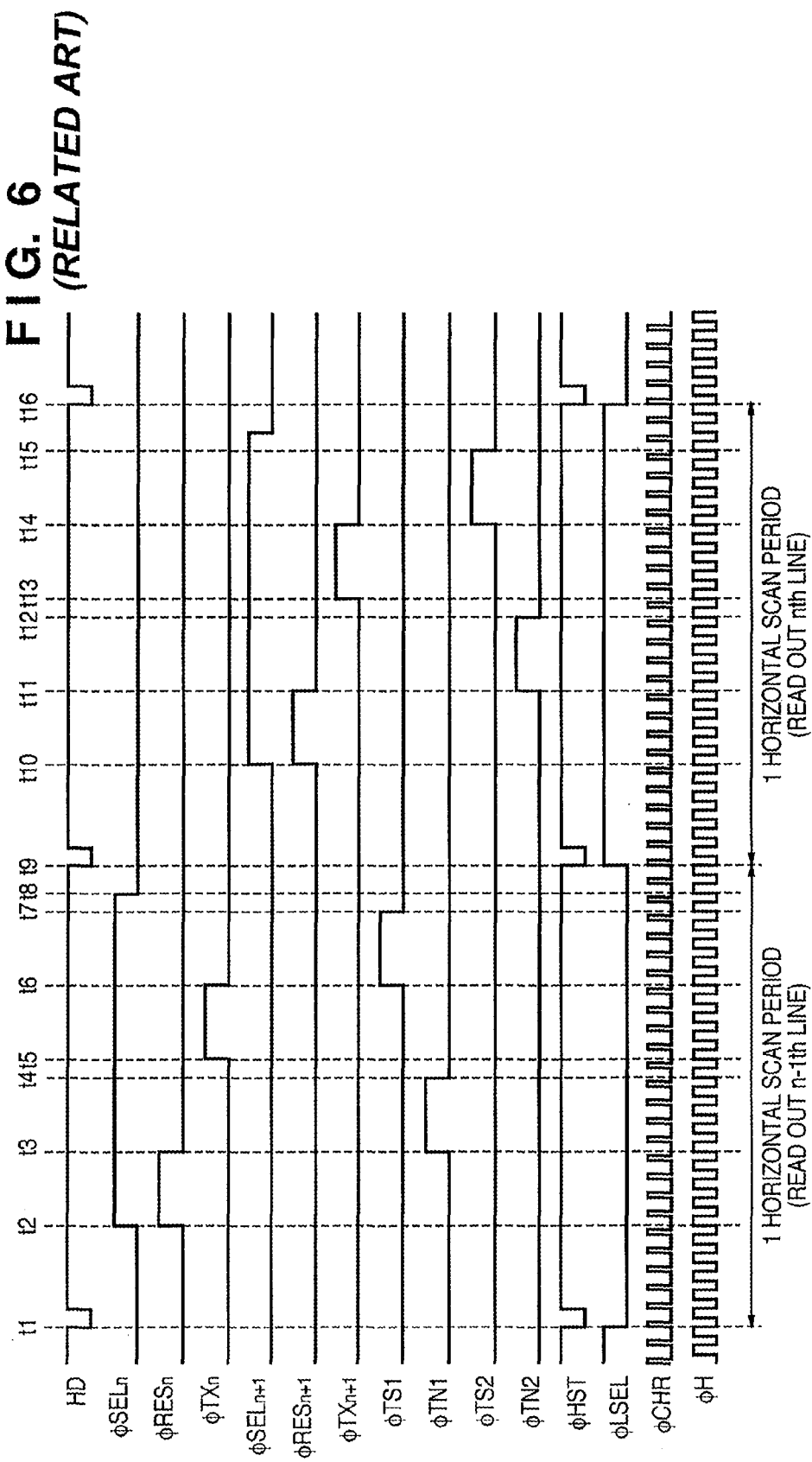
FIG. 6 is a diagram illustrating the driving timing of a conventional image sensor.

FIG. 6 is a diagram illustrating the driving timing of a conventional image sensor. Note that FIG. 6 assumes to operate an image sensor similar in configuration to the image sensor illustrated in FIG.

At time t1, a horizontal driving signal HD, φHST, and φLSEL drop to low-level (called "low" hereinafter). When the φHST signal inverts from low-level to high-level (called "high" hereinafter), columns to be read to the horizontal readout lines 22 and 23 shifts at the leading edge of each horizontal scanning clock φH. During the horizontal scan period, in which a signal of one line is read out, and which spans from t1 to t9, φLSEL is low, and therefore the output of the AND gates 28 are low, and the output of the AND gates 29 can be high. Accordingly, the readout switches 18 and 19 are switched off, and the readout switches 20 and 21 corresponding to the high AND gate 29 are switched on. Therefore, the signals stored in the transfer capacitances 16 are sequentially read out to the horizontal readout line 22 via the readout switches 20, in synchronization with the horizontal scanning clock φH inputted into the horizontal scanning circuit 24. Furthermore, the signals stored in the transfer capacitances 17 are sequentially read out to the horizontal readout line 23 via the readout switches 21. At this time, the signals stored in the transfer capacitances 14 and 15 are not read out, since the readout switches 18 and 19 are switched off. The output amplifier 25 then carries out an output operation for outputting the differential signal between the horizontal readout line 22 and the horizontal readout line 23 to the exterior. The signal outputted at this time is the signal of the (n−1)th line (n being an integer of 2 or more; the same applies hereinafter).

Next, descriptions shall be provided regarding the transfer of the signal charge accumulated in the photoelectric converters 2 of the nth line to the transfer capacitances, which is carried out in parallel with outputting the signals to the exterior as described above.

First, at time t2, φSELn goes to high, switching the line selection switch 7 on, and the pixel circuits of the nth line are connected to the vertical output lines 8. Similarly, φRESn goes to high, switching the reset switches 4 on, clearing the unnecessary charge accumulated in the storage capacitances 5. At this time, the number of reset switches 4 that are driven is the same as the number of pixels in the horizontal direction in the image sensor. Therefore, it is necessary for the pulse for driving the reset switches 4 to provide a current that is sufficient to drive the gate capacitances of multiple reset switches 4. However, if such a large current pulse is present in the image sensor, the reference potential and ground potential of the image sensor become unstable due to parasitic capacitance, parasitic resistance, and the like in the circuit included in the image sensor, leading to noise entering the output signal. This phenomenon occurs particularly at the edges of the pulse (i.e. when the pulse changes).

At time t3, φRESn goes to low and the reset finishes; meanwhile, φTN1 goes to high, the transfer gates 11 are turned on, and the noise component arising in each pixel circuit in the nth line is stored in the transfer capacitance 15. Here, noise enters the signals stored in the transfer capacitances 17 of the (n−1)th line, or enters the signals output of the (n−1)th line in the horizontal output line, due to the influence of the driving pulse φTN1.

At time t4, φTN1 goes to low, the transfer gates 11 are turned off, and the noise component generated in each pixel circuit in the nth line has been stored in the transfer capacitance 15.

At time t5, φTXn goes to high, the transfer switch 3 of each pixel circuit in the nth line is turned on, and the signal charge accumulated in the photoelectric converter 2 is transferred to the storage capacitance 5.

At time t6, φTS1 goes to high, the transfer gates 10 are turned on, the signal charge in the storage capacitances 5 is amplified and converted into voltages by the source follower amplifiers 6 and stored in the transfer capacitances 14. Here, noise enters the signal stored in the transfer capacitances 16 in the (n−1)th line, or enters the signal output in the (n−1)th line in the horizontal output line, due to the influence of the driving pulse φTS1.

At time t7, φTS1 goes to low, the transfer gates 10 are turned off, and the storage into the transfer capacitances 14 finishes.

After this, the signals of the nth line are outputted from the output amplifier 25 during the next horizontal scan period, which starts from time t9.

As described above, storage of signals of the nth line into the transfer capacitances and the output of the signals of the (n−1)th line (that is, the horizontal scan) are carried out in parallel. While this reduces the time required for readout from the image sensor, noise enters the signals of the (n−1)th line stored in the transfer capacitances, or enters the signal output of the (n−1)th line in the horizontal readout line, as explained for time t3, time t6, and so on.

Figure 2:
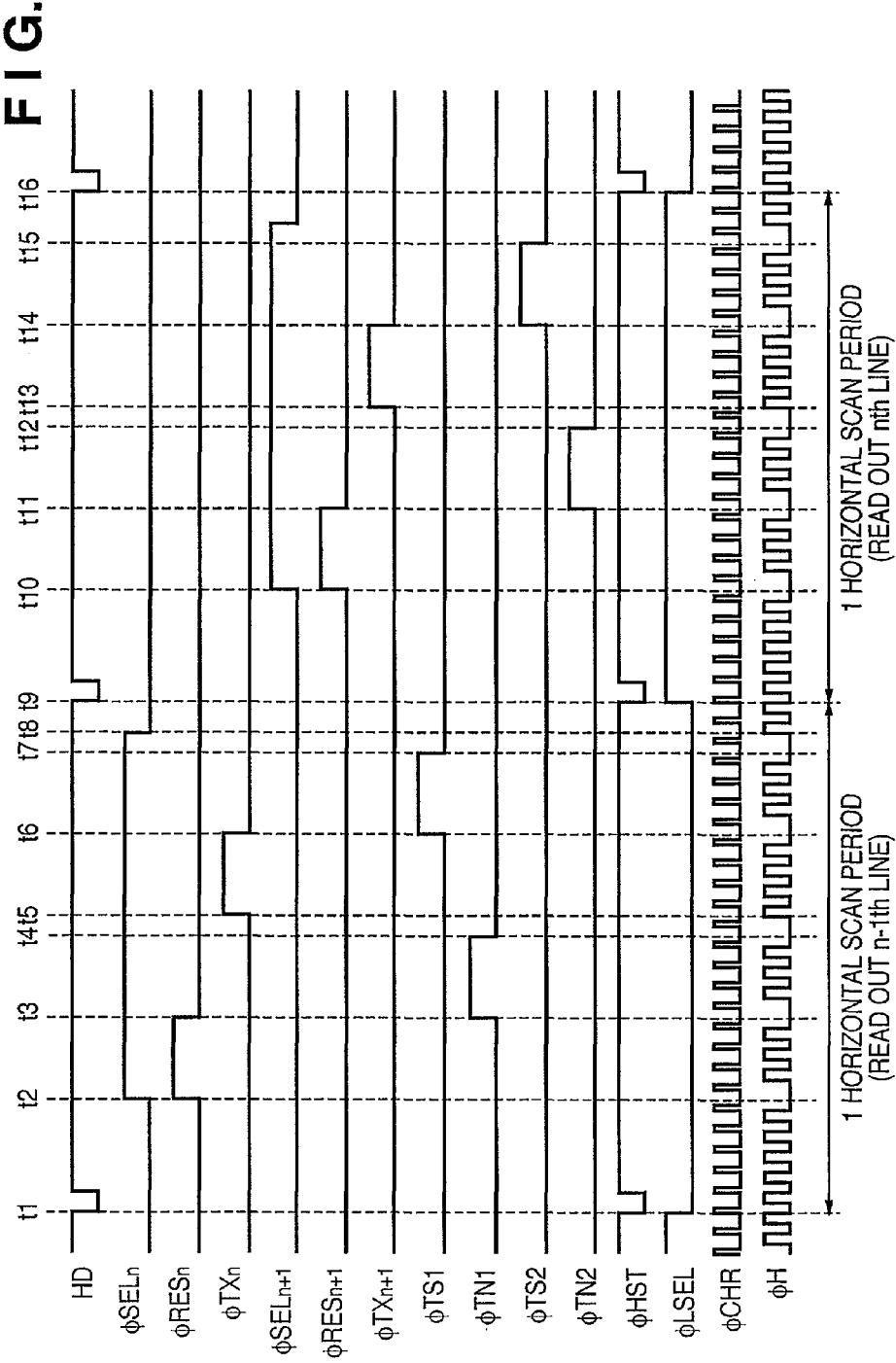
FIG. 2 is a diagram illustrating the driving timing of the image sensor according to the preferred embodiment of the present invention.

FIG. 2 is a diagram illustrating the driving timing of the image sensor according to a preferred embodiment of the present invention. The operation of the image sensor according to the present embodiment shall be described using FIGS. 1 and 2.

At time t1, a horizontal driving signal HD, φHST, and φLSEL turn low. When, the φHST signal inverts from low to high, columns to be read to the horizontal readout lines 22 and 23 shifts at the leading edge of each horizontal scanning clock φH. During the horizontal scan period, which spans from t1 to t9, φLSEL is low, and therefore the output of the AND gates 28 are low, and the output of the AND gates 29 can be high. Accordingly, the readout switches 18 and 19 are switched off, and the readout switches 20 and 21 corresponding to the high AND gate 29 are switched on. Therefore, the signals stored in the transfer capacitances 16 are sequentially read out to the horizontal readout line 22 via the readout switches 20, in synchronization with the horizontal scanning clock φH inputted into the horizontal scanning circuit 24. Furthermore, the signals stored in the transfer capacitances 17 are sequentially read out to the horizontal readout line 23 via the readout switches 21. At this time, because the readout switches 18 and 19 are off, the signals stored in the transfer capacitances 14 and 15 are not read out.

The output amplifier 25 outputs the differential signal between the horizontal readout line 22 and the horizontal readout line 23 to the exterior. At this time, the outputted signal is the signal of the n−1th line. In the present embodiment, the horizontal scanning clock φH is thinned out at predetermined times, which shall be described later; this can be seen in FIG. 2.

Next, descriptions shall be provided regarding the transfer of the signal charge accumulated in the photoelectric converters 2 of the nth line to the transfer capacitances, which is carried out in parallel with outputting the signals to the exterior as described above.

First, at time t2, φSELn goes to high, switching the line selection switch 7 on, and the pixel circuits of the nth line are connected to the vertical output line 8. Similarly, φRESn goes to high, switching the reset switch 4 on, clearing the unnecessary charge accumulated in the storage capacitance 5. At time t2, the horizontal scanning clock φH remains low (i.e. the supply of the horizontal scanning clock φH temporarily stops). As a result, the operation of the horizontal scanning circuit 24 temporarily stops, and thus the output of the signal of the (n−1)th line stops as well.

At time t3, φRESn goes to low and the reset finishes; meanwhile, φTN1 goes to high, the transfer gates 11 are turned on, and the noise component arising in each pixel circuit in the nth line is stored in the transfer capacitance 15. The horizontal scanning clock φH also remains low at time t3, and thus the operation of the horizontal scanning circuit 24 temporarily stops.

At time t4, φTN1 goes to low, the transfer gates 11 are turned off, and the noise component generated in each pixel circuit in the nth line finishes being stored in the transfer capacitance 15. The horizontal scanning clock φH also remains low at time t4, and thus the operation of the horizontal scanning circuit 24 temporarily stops.

At time t5, φTXn goes to high, the transfer switch 3 of each pixel circuit in the nth line is turned on, and the signal charge accumulated in the photoelectric converter 2 is transferred to the storage capacitance 5.

At time t6, φTS1 goes to high, the transfer gates 10 are turned on, the signal charge in the storage capacitances 5 is amplified and converted into voltages by the source follower amplifiers 6, and stored in the transfer capacitances 14. The horizontal scanning clock φH also remains low at time t6, and thus the operation of the horizontal scanning circuit 24 temporarily stops.

At time t7, φTS1 goes to low, the transfer gates 10 are turned off, and the storage into the transfer capacitances 14 finishes. The horizontal scanning clock φH also remains low at time t7, and thus the operation of the horizontal scanning circuit 24 temporarily stops.

After this, the signals of the nth line are outputted from the output amplifier 25 during the next horizontal scan period, which starts from time t9. The horizontal scanning clock φH remains low at times t10, t11, t12, t14, and t15, and the operation of the horizontal scanning circuit 24 temporarily stops, in the same manner as the signal readout period of the (n−1)th line as described above.

Accordingly, storage into the transfer capacitances in the nth line and the output of the signals of the (n−1)th line (that is, the horizontal scan) are carried out in parallel, which reduces the time required for readout from the image sensor. Furthermore, a signal in which noise has been suppressed can be outputted by stopping readout of the signal (in other words, stopping the horizontal scanning clock φH) near the edges of the driving pulses, which are a source of noise.

Although in the present embodiment, the horizontal scanning clock is stopped at the edges of three types of driving pulses for the image sensor, the present invention is not intended to be limited thereto. That is, the horizontal scanning clock φH may be kept at low, temporarily stopping the operation of the horizontal scanning circuit 24, for example at the edges of any driving pulses that can be a cause of noise (i.e. the driving pulse applied to the image sensor).

Furthermore, while the period during which the horizontal scanning clock φH is low is, in the present embodiment, a single clock period occurring at the edge of the driving pulse, the present invention is not intended to be limited thereto. For example, if noise caused by the driving pulse enters over a plural-clock period, the supply of the horizontal scanning clock φH may be stopped for at least that period.

Note that the presence of a period during which the horizontal scanning clock φH is stopped results in the horizontal scan period becoming longer by the amount for which the clock has been stopped, as is the case in the present embodiment. However, the interval during which the clock is stopped is very short, and thus in today's image sensors, in which the number of pixels is large and a single horizontal scan period is long, this can essentially be ignored.

Next, descriptions shall be provided regarding an imaging system using the imaging apparatus and control method thereof as described in the above embodiment.

Figure 3:
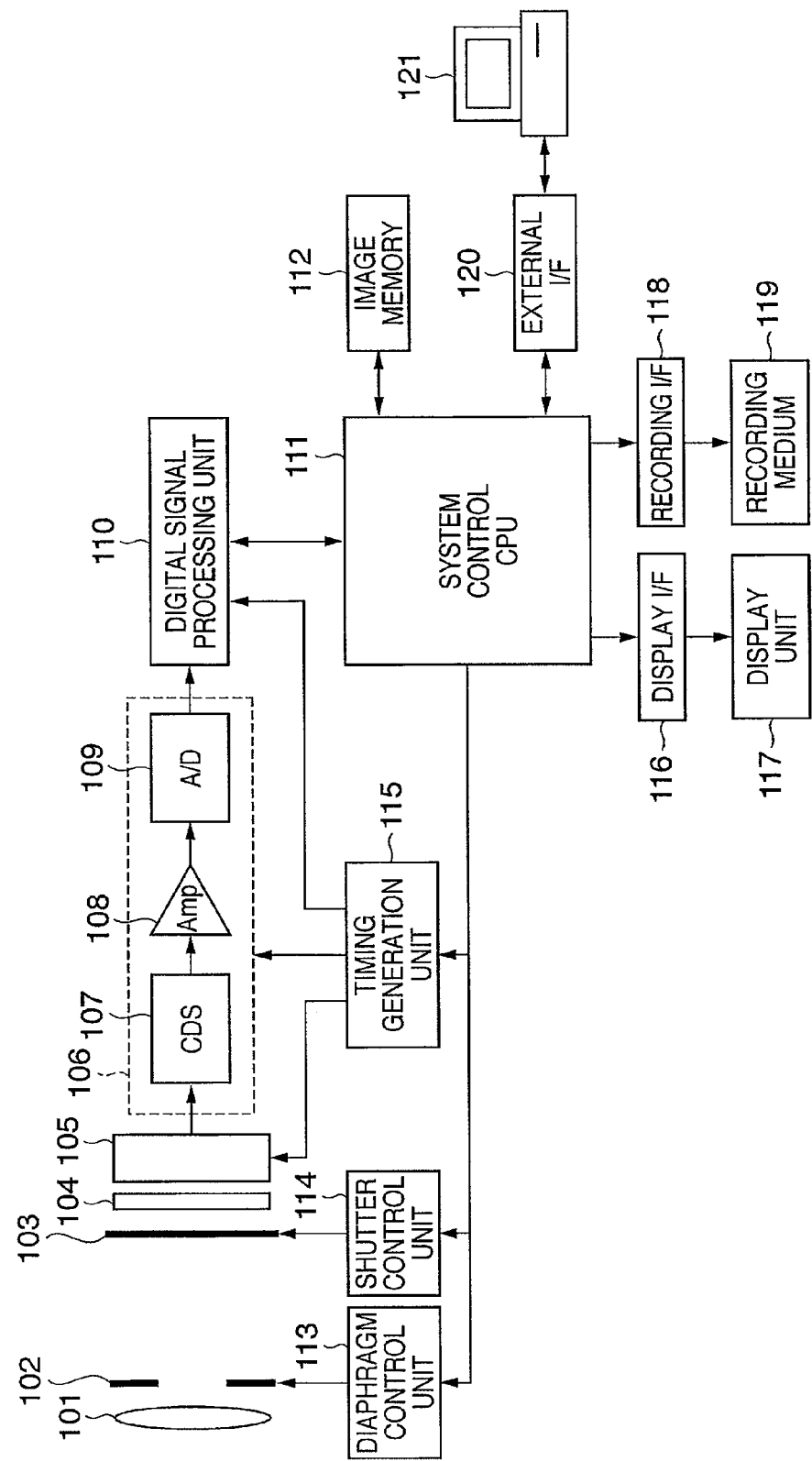
FIG. 3 is a block diagram illustrating a case where an imaging system according to the embodiment of the present invention is applied to a digital still camera.

FIG. 3 is a block diagram illustrating a digital still camera serving as the imaging apparatus according to the present embodiment.

In FIG. 3, reference numeral 101 represents a lens for forming an optical image of a subject onto an image sensor 105, and reference numeral 102 represents a diaphragm for making it possible to alter the amount of light passing through the lens 101, the diaphragm 102 being controlled by a diaphragm control unit 113. Reference numeral 103 represents a mechanical shutter that controls entering of the light of the subject image formed by the lens 101 to the image sensor 105, the shutter 103 being controlled by a shutter control unit 114. Reference numeral 104 represents an optical filter that controls the wavelength and spatial frequency of the light that enters the image sensor 105, and reference numeral 105 represents the image sensor for capturing the subject image formed by the lens 101 as an image signal. A plurality of pixels, each including a photoelectric converter 2, are disposed in lines and columns in the image sensor 105, as illustrated in FIG. 1. Reference numeral 106 represents an analog front-end, which performs analog processing and analog-digital conversion processing on the image signal outputted from the image sensor 105. The analog front-end 106 is configured of a CDS circuit 107 for removing noise; an amplifier 108 for adjusting the gain of the signal; and an A/D converter 109 for digitizing an analog signal. Reference numeral 110 represents a digital signal processing unit that performs various adjustments on the digital image data outputted from the analog front-end 106, compresses that digital image data, and so on. Reference numeral 115 represents a timing generation unit that outputs various timing signals to the image sensor 105, the analog front-end 106, and the digital signal processing unit 110. Reference numeral 111 represents a system control CPU that performs various processes and controls the digital still camera as a whole, and reference numeral 112 represents an image memory for temporarily storing image data. Reference numeral 116 represents a display interface (display I/F) for displaying a captured image, and reference numeral 117 represents a display unit, such as a liquid-crystal display. Reference numeral 118 represents a recording interface unit (recording I/F) for recording into/reading out from a recording medium. Reference numeral 119 represents a removable recording medium, such as a semiconductor memory, into/from which image data is recorded/read out, and reference numeral 120 represents an external interface unit (external I/F) for communicating with an external computer 121 or the like. Note that the image sensor 105 is an image sensor according to the present embodiment and is driven at the driving timing according to the present embodiment.

Next, operations of the imaging system configured as illustrated in FIG. 3 at the time of capturing an image shall be described.

The main power is turned on when a power switch (not shown) is turned on. Next, the power to the control system is turned on, after which the power to the imaging system circuit, e.g. the analog front-end 106, is turned on as well.

Then, the system control CPU 111 opens the diaphragm 102 via the diaphragm control unit 113 in order to control the light exposure, and opens the mechanical shutter 103 via the shutter control unit 114. The signal outputted from the image sensor 105 is converted by the A/D converter 109 to digital image data, which is inputted into the digital signal processing unit 110. The system control CPU 111 calculates the exposure based on that data.

The brightness is determined based on the results of this photometry, and the system control CPU 111 controls the diaphragm 102 in accordance with the results of the determination.

Next, the high-frequency components are extracted from the signal outputted from the image sensor 105, and the system control CPU 111 calculates the distance to the subject. After that, the lens 101 is driven, and it is determined whether or not the lens is focused. If it is determined that the lens is not focused, the lens 101 is driven once again. In this manner, focus adjustment processing is performed.

After the focus has been confirmed, the main exposure is commenced and completed, using an electronic shutter function of the image sensor 105. Note that the commencement and completion of the main exposure may be carried out by opening and closing the mechanical shutter 103 as well. After this, the image signal is sequentially outputted on a line-by-line basis. Noise removal, such as correlated double sampling, amplification, and A/D conversion are performed by the analog front-end 106 on the image signal outputted from the image sensor 105. The digitized image signal is then written into the image memory 112 by the system control CPU 111 via the digital signal processing unit 110. After that, the image data stored in the image memory 112 is recorded in the recording medium 119, which is a removable semiconductor memory or the like, via the recording interface unit 118, as a result of control performed by the system control CPU 111. The captured image data is also displayed on the display unit 117, which is a liquid-crystal display or the like, via the display interface 116. Alternatively, the image data may be directly inputted into the computer 121 or the like via the external interface unit 120, and the image may be processed thereafter.

Figure 4:
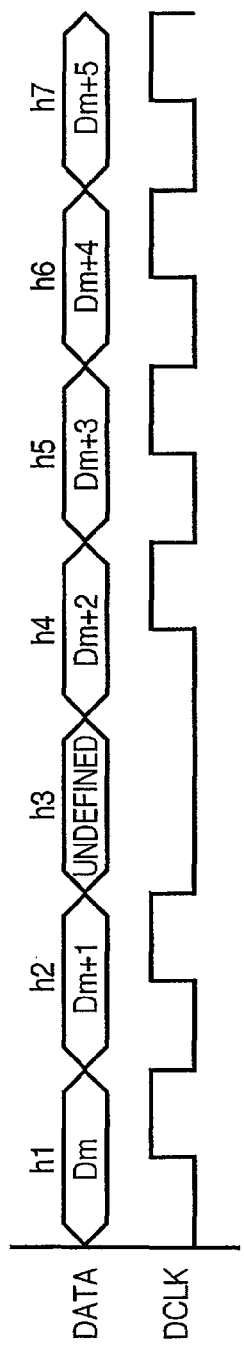
FIG. 4 is a timing chart illustrating the relationship between digital image data DATA and a clock pulse DCLK.

Next, operations upon applying the imaging apparatus and control method thereof according to the present embodiment to the imaging system illustrated in FIG. 3 shall be described using FIG. 4.

FIG. 4 is a timing chart illustrating the relationship between digital image data DATA and a clock pulse DCLK. The digital image data DATA is a signal outputted from the analog front-end 106 and inputted into the digital signal processing unit 110. The clock pulse DCLK is a synchronization signal, synchronized with the digital image data DATA, that regulates the timing for importing the digital image data DATA into the digital signal processing unit 110. Note that the clock pulse DCLK is supplied by the timing generation unit 115 illustrated in FIG. 3.

In FIG. 4, the digital image data DATA outputted at timing h3 is equivalent to the signal when the supply of the horizontal scanning clock φH is stopped, as described above; in actuality, it is a signal that is not needed as an image signal, and thus the value thereof is undefined. At this time, by keeping the clock pulse DCLK low and stopping the supply thereof, the unneeded signal is not imported into the digital signal processing unit 110, thus making it possible to save the space in the image memory 112. Furthermore, wasteful processing, such as deleting the unneeded signal at a later time, no longer needs to be carried out.

Figure 5:
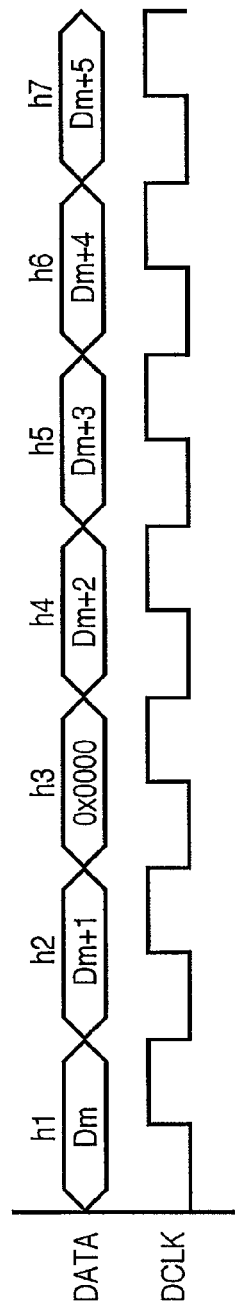
FIG. 5 is another timing chart illustrating the relationship between the digital image data DATA and the clock pulse DCLK.

FIG. 5 is another timing chart illustrating the relationship between the digital image data DATA and the clock pulse DCLK.

In FIG. 5, the digital image data DATA at timing h3 is, as described above, equivalent to the signal when the supply of the horizontal scanning clock φH is stopped, and is, in actuality, a signal that is not needed as an image signal. Accordingly, with the method illustrated in FIG. 5, the digital image data value is fixed at a predetermined specific value, such as hexadecimal 0000 (0x0000), in the analog front-end 106. Here, the digital signal processing unit 110 is configured so as not to import the digital image data value in the case where the stated specific value (for example, 0x0000) is inputted. Therefore, the unneeded signal is not imported into the digital signal processing unit 110, thus making it possible to save the space in the image memory. Furthermore, wasteful processing, such as deleting the unneeded signal at a later time no longer needs to be carried out. It should be noted that although the value of the digital image data equivalent to the output signal occurring when the supply of the horizontal scanning clock φH is stopped has been described as 0x0000, a different value may be used.

Note that although the timing generation unit 115 is configured independently in the imaging system according to the present embodiment, the timing generation unit 115 may be formed on the semiconductor substrate of the image sensor 105 to integrate the timing generation unit 115 with the image sensor 105. Similarly, the timing generation unit 115 may be integrated with the analog front-end 106 or the digital signal processing unit 110.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-117562, filed Apr. 26, 2007 which is hereby incorporated by reference herein in its entirety.

What is claimed is:

1. An imaging apparatus comprising:
an image sensor that includes a plurality of pixels, disposed in line and column directions, each having a photoelectric conversion unit, a first storage unit configured to store a signal read out from pixels in the (n−1)th line (n being an integer of 2 or more) of the plurality of pixels, and a second storage unit configured to store a signal read out from pixels in the nth line of the plurality of pixels; and a control unit configured to control to read out the signal of the pixels in the nth line to the second storage unit while in parallel reading out from the first storage unit and outputting the signal of the pixels in the (n−1)th line, and temporally stop the in parallel outputting the signal of the pixels in the (n−1)th line from the first storage unit when driving pulses for reading out the signal from the pixels in the nth line to the second storage unit change, wherein the signal read out from the pixels includes a signal component, generated by photoelectric conversion by the photoelectric conversion unit, and a noise component, and the driving pulses include a first driving pulse for reading out the noise component and a second pulse for reading out a sum of the noise component and the signal component.

2. The imaging apparatus according to claim 1 further comprising:

an A/D converter that converts the signals output from the image sensor into digital signals;

a timing generator that generates a synchronizing signal which is synchronized with the digital signals; and a digital signal processor that imports the digital signals in synchronization with the synchronizing signal, and performs predetermined processing, wherein the control unit controls the A/D converter so as to output a digital signal of a predetermined value while the outputting of the signal from the first storage unit is temporally stopped.

3. The imaging apparatus according to claim 1, wherein the control unit controls to temporally stop outputting the signal of the pixels in the (n−1)th line stored in the first storage unit when each of the first driving pulse and the second driving pulse for reading out the signal of the pixels in the nth line changes.

4. The imaging apparatus according to claim 1, further comprising:

an A/D conversion unit configured to convert the signal outputted from the image sensor into a digital signal;

a timing generation unit configured to generate a synchronization signal in synchronization with the digital signal; and a digital signal processing unit configured to import the digital signal in synchronization with the synchronization signal, and performs predetermined processing, wherein the control unit controls the timing generation unit to stop providing the synchronization signal while the outputting of the signal from the first storage unit is temporally stopped.

5. The imaging apparatus according to claim 1, wherein said in parallel reading out from the first storage unit is in accordance with a clock signal and said temporally stop outputting the signal of the pixels in the (n−1)th line from the first storage unit occurs by temporarily stopping said clock signal.

* * * * *